(12) United States Patent
Shon

(10) Patent No.: US 6,171,428 B1
(45) Date of Patent: Jan. 9, 2001

(54) METHOD FOR FABRICATING AUTOMOTIVE DOOR TRIMS

(75) Inventor: Inn-Tae Shon, Inchon (KR)

(73) Assignee: Dongseo Kiyeon Co., Ltd., Inchon (KR)

( * ) Notice: Under 35 U.S.C. 154(b), the term of this patent shall be extended for 0 days.

(21) Appl. No.: 09/389,961

(22) Filed: Sep. 3, 1999

(51) Int. Cl.$^7$ ........................................................ B65C 1/00
(52) U.S. Cl. .......................... 156/212; 156/257; 29/407.01
(58) Field of Search .................... 29/407.01; 156/212, 156/213, 214, 468, 257, 251

(56) References Cited

U.S. PATENT DOCUMENTS

| | | | |
|---|---|---|---|
| 4,958,883 | * | 9/1990 | Iwaki et al. ............................ 296/152 |
| 5,080,749 | * | 1/1992 | Moriya et al. ......................... 156/382 |
| 5,236,534 | | 8/1993 | Noguti et al. ......................... 236/245 |
| 5,297,842 | * | 3/1994 | Hayashi ............................... 296/146.7 |
| 5,326,417 | * | 7/1994 | Phelps ................................. 156/267 |
| 5,395,580 | * | 3/1995 | Morita et al. ......................... 264/266 |
| 5,431,768 | * | 7/1995 | Doumae et al. ....................... 156/477.1 |
| 5,486,329 | * | 1/1996 | Ueki et al. ............................ 264/273 |
| 5,609,709 | * | 3/1997 | Doumae et al. ....................... 156/216 |
| 5,616,139 | * | 4/1997 | Ueki et al. ............................ 428/139 |
| 5,695,865 | * | 12/1997 | Shimizu ............................... 428/212 |
| 5,741,386 | * | 4/1998 | Tomioka et al. ...................... 156/212 |
| 5,811,053 | * | 9/1998 | Ota et al. .............................. 264/511 |
| 5,919,324 | * | 7/1999 | Moffitt et al. ........................ 156/79 |
| 5,951,802 | * | 9/1999 | Deeks .................................. 156/214 |

* cited by examiner

Primary Examiner—S. Thomas Hughes
Assistant Examiner—Essama Omgba
(74) Attorney, Agent, or Firm—Long, Aldridge & Norman LLP

(57) ABSTRACT

A method for fabricating an automotive door trim includes the steps of: forming a door trim main body which has a core layer, a foam layer, and a skin sheet, having at least one accessory in a predetermined position thereof, and a plurality of grooves for defining the predetermined surface area; placing the door trim main body on a lower die which has at least one hole corresponding to the accessory of the door trim main body; forming a slit in corresponding groove of the door trim main body by fusing the skin sheet and the foam layer with a thermal cutter of a first upper die; providing a second upper die having a cloth cutter; providing a clamping device under the second upper die for holding an ornamental member which has a bonding agent on a corresponding surface of the predetermined surface area; moving the lower die under the clamping device; lowering the clamping device thereby contacting the ornamental member and the door trim main body; lowering the second upper die thereby cutting the ornamental member with the cloth cutter to obtain a desired shape; providing a third upper die having an inserting bar having a protruded inserting blade in a lower end of the inserting bar; and lowering the third upper die so that the peripheral end of the ornamental member may be forced into the slit of the groove of the door trim main body. The door trim main body can be made of plastics, and the process for making the slit can be omitted.

2 Claims, 5 Drawing Sheets

METHOD FOR FABRICATING AUTOMOTIVE DOOR TRIMS

BACKGROUND OF THE INVENTION

The present invention generally relates to a method of fabricating a door trim of a vehicle, and more particularly, to a fabrication method in which the ornamental cloths can be firmly attached to the center part of the door trim.

Generally, the automotive door trims have an ornamental member such as cloth, carpet, and others on appropriate parts of the door trims, on the purpose of ornamentation or comfort feeling.

A prior art of mounting such an ornamental member on a door trim is disclosed in U.S. Pat. No. 5,236,534, wherein a non-preformed decorative member is contact-bonded and fixed by use of a mold for contact bonding to the main body of a door trim according to its complicatedly curved surface, excessive portions of the decorative member are cut away by a fusing blade attached to a bottom tool for contact bonding, and the decorative member is subjected to a peripheral/end edge treatment by a press-in bar.

By the way, when the door trim main body is placed on a surface of a bonding upper die, a vacuum device is needed for holding the main body on the upper die, which result in a high cost. And, during the process the workers should hold the main body before the device is applied, which makes the workers tired.

SUMMARY OF THE INVENTION

Therefore, it is a first object of the present invention to provide a method of fabricating automotive door trim which can reduce a fabricating cost.

It is a second object of the present invention to provide the method which can release the endeavor of the workers.

It is a third object of the present invention to firmly fix the peripheral edge of the ornamental member into the main body.

To achieve the first and second objects, the present invention provides a method for placing the door main body on a lower die, which has a sensor for detecting the accurate placement of the body.

To achieve the third object, the peripheral edge of the ornamental member is fixed into a slit formed in the door trim main body.

The method according to one embodiment of the present invention is done using a lower die, a first upper die, a second upper die, and a third upper die.

The method according to another embodiment of the present invention uses door trim main body made of plastics.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Before describing the embodiment of the present invention, the structure of the door trim main body is explained in brief.

The door trim main body according to the first embodiment of the present invention consists of three layers, that is, a PVC sheet, a foam layer, and a core member, and has a main groove which define the area for an ornamental member. The method for fabricating the door trim main body is well known and is omitted in this specification.

The door trim which includes a PVC sheet is generally used for a high qualified vehicle. But while the vehicle having the door trim is being heated in such a situation that it is being shipped, the PVC sheet may be separated from the core member of the door trim.

Thus it is necessary to maintain the adhesion between the PVC sheet and the core member, and the first embodiment of the invention also aims it.

Figure 1:
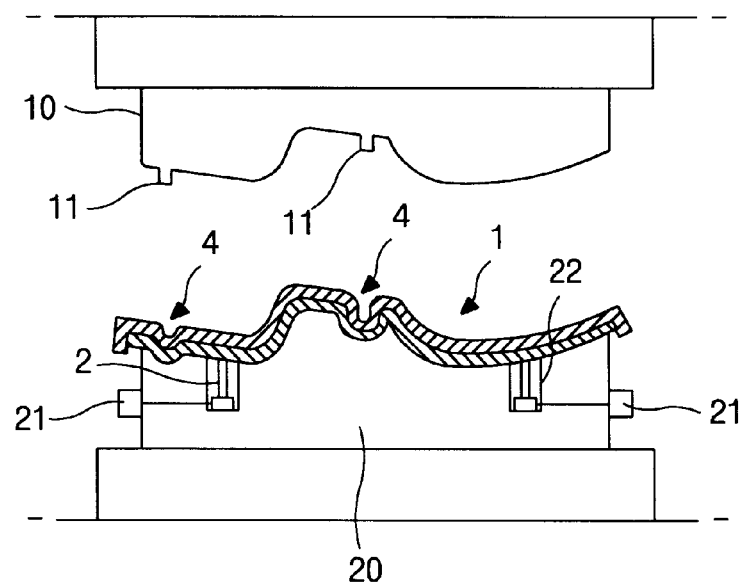
FIG. 1 is a front view showing a process of fabricating an automotive door trim with a first die according to a first embodiment of the present invention.

Referring to FIG. 1, the door trim main body 1 which has accessories 2 such as a retainer or a bracket is placed on a jig or a lower mould die 20. The lower die 20 has a plurality of holes 22 in corresponding positions of the accessories 2, and a contact sensor or limit switch sensor 21 in the holes 22.

Thus the accurate mounting of the main body 1 can be detected by the contact sensor 21.

Figure 2:
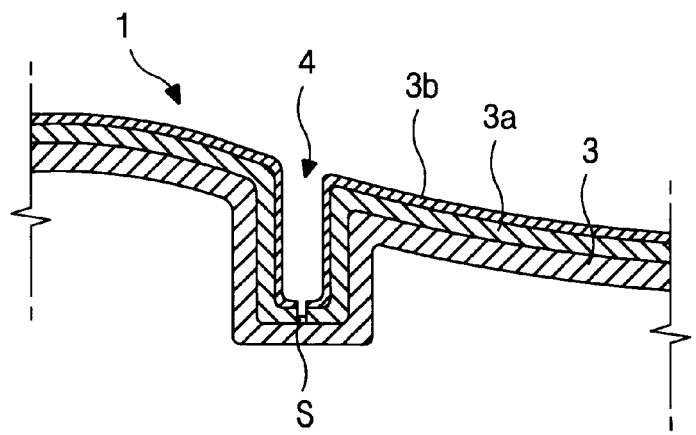
FIG. 2 is a sectional view showing a slit the door trim fabricated by the method shown in FIG. 1.

When the main body 1 is accurately placed on the lower die 20, a vertically moveable thermal cutters 11 of a slit forming die or first upper die 10 are lowered. The cutters 11 are arranged on the first upper die 10 in order to correspond with the positions of the main grooves 4, preferably corresponding to the center of the main grooves 4. The cutters 11 fuse the PVC sheet 3b and the foam layer 3a and form slits S, as shown in FIG. 2.

Figure 3:
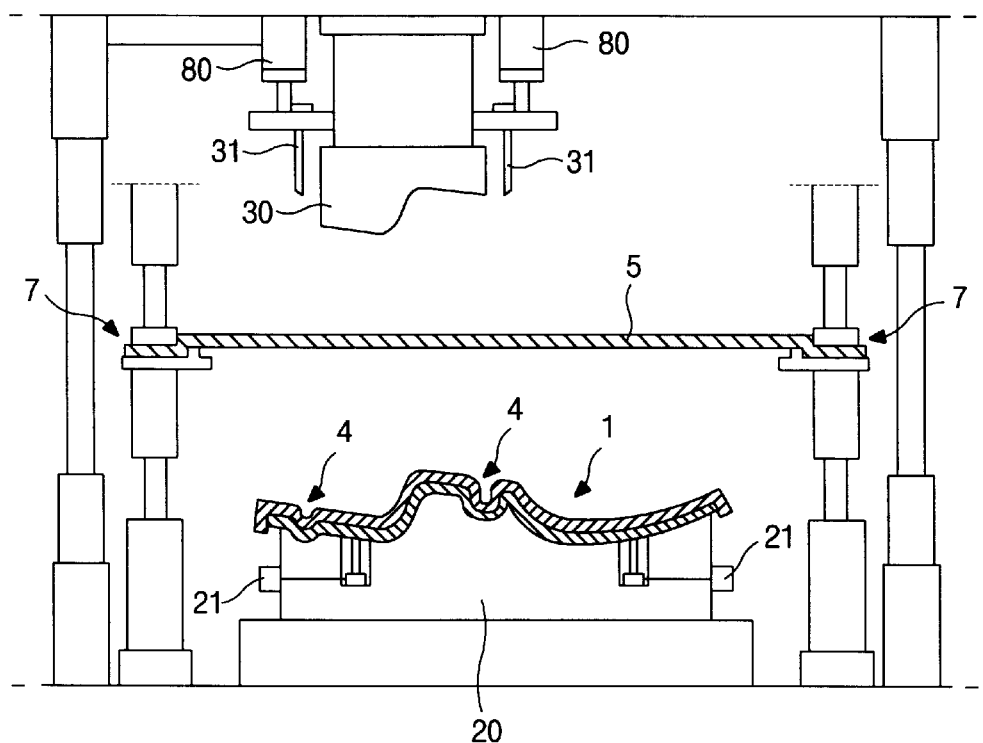
FIG. 3 is a front view of the process in which an ornamental member is being attached to the door trim main body of FIG. 1 with a second die.

The lower die 20 with the mounted door trim main body 1 is moved to the position of a cutting die or second upper die 30 which has cloth cutters 31 and can be moved in vertical direction by actuators 80, as shown in FIG. 3. Between the lower die 20 and the second upper die 30 lies a clamp device 70 which holds an ornamental member 5 on the bottom surface of which an adhesive is deposited in advance.

The clamp device 70 is then lowered so that the ornamental member 5 contacts the surface of the door trim main body 1 on the lower die 20. Since the surface of the door trim main body 1 is curved, the ornamental member 5 contacts the main body 1 with higher tension.

Figure 4:
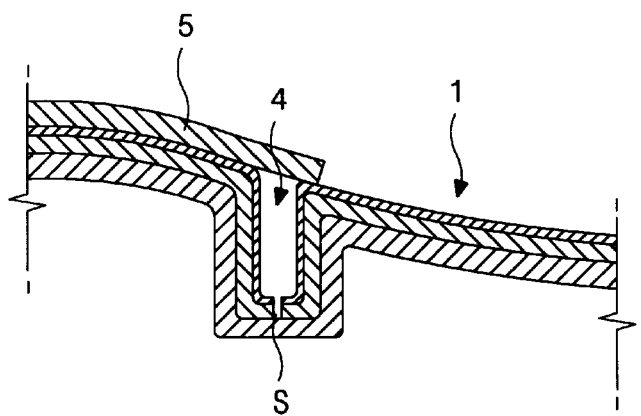
FIG. 4 is a sectional view showing the ornamental member contacting the door trim main body after the process of FIG. 3.

The second upper die 30 is lowered to cut the ornamental member 5 with the cloth cutter 31. The cutting position of the cloth cutter 31 is shown in FIG. 4, which shows the ornamental member 5 is cut so that the edge of the ornamental member 5 covers the main groove 4.

Then the upper die 30 press the ornamental member 5 in order to be fixed on the door trim main body 1.

The lower die 20 is moved to the position of an inserting die or third upper die 50, while another lower die with corresponding door trim main body is moved toward the second upper die 30 for successive process.

The third upper die 50 has an inserting bar 51 which has an inserting blade 52 in its end.

Figure 5:
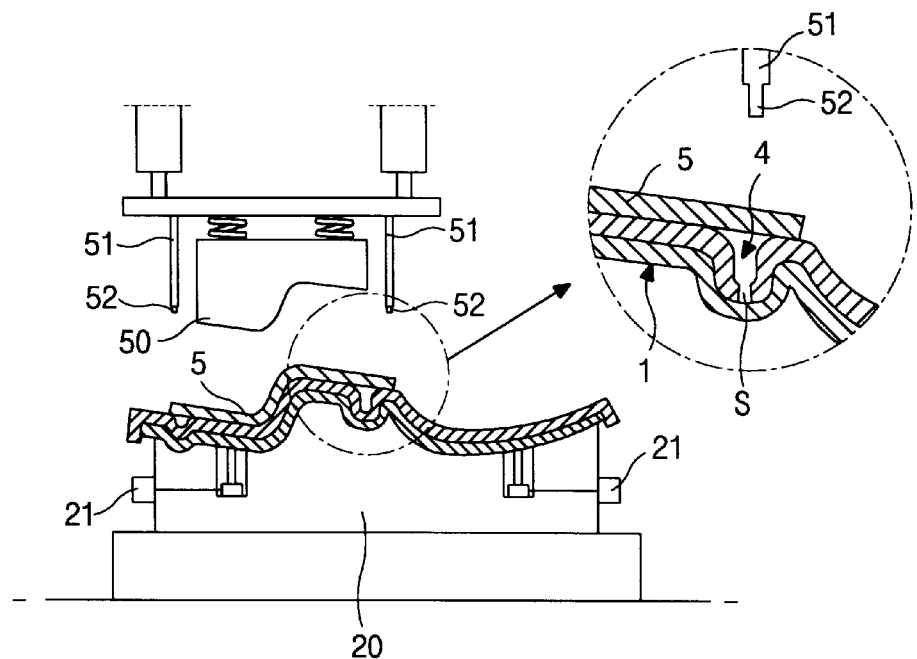
FIG. 5 is a front view of the process in which the peripheral edge of the ornamental member is being inserted into the slit shown in FIG. 2.
Figure 6:
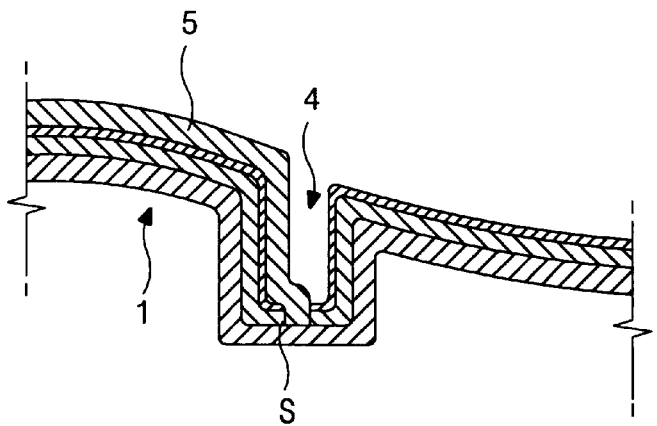
FIG. 6 is a sectional view showing the edge of the ornamental member is inserted into the slit after the process of FIG. 5.

As shown in FIGS. 5 and 6, the third upper die 50 is lower, and the peripheral edge of the ornamental member 5 is inserted into the main groove 4 of the door trim body 1. The peripheral end of the ornamental member 5 is inserted into the slit S to achieve a firm fixation.

The slit S of this embodiment helps to maintain the adhesion between the PVC sheet and the core member while being heated.

The door trim main body according to the second embodiment of the present invention includes at least one layer made of plastic material, and may includes a skin sheet made of cloths or some other material. The second embodiment of this invention aims to fabricate a door trim having no PVC sheet, thus it is not necessary to make the slit of the first embodiment. The method for fabricating the door trim main body is well known and is omitted in this specification.

Figure 7:
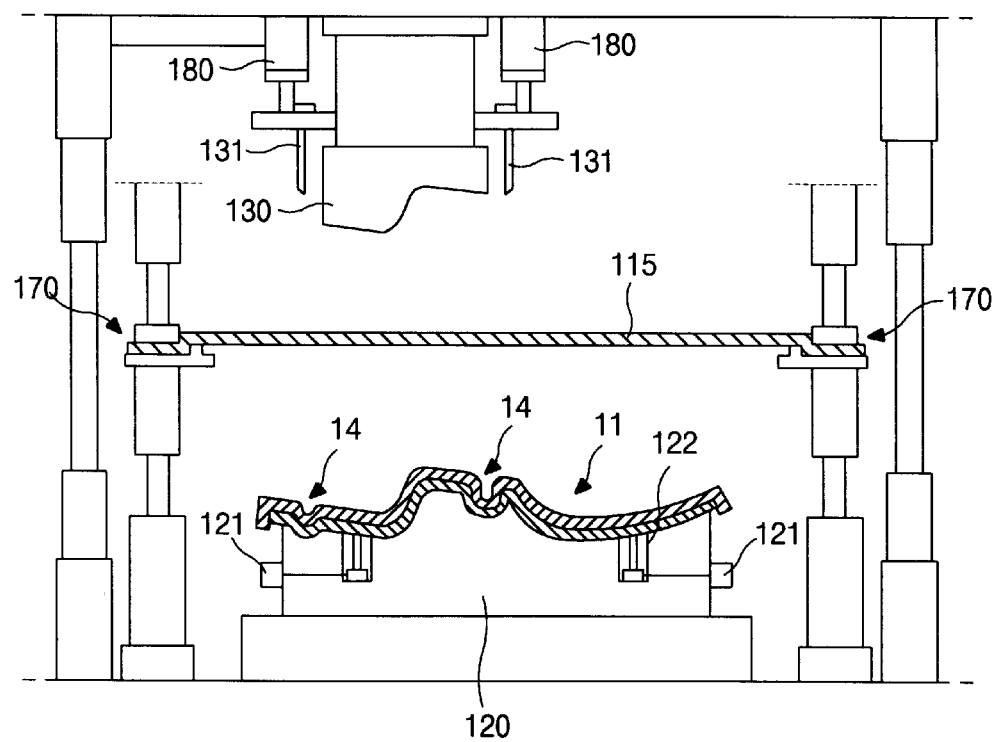
FIG. 7 is a front view showing a process of fabricating an automotive door trim with a first die according to a second embodiment of the present invention.

Referring to FIG. 7, the door trim main body 11 which has accessories 12 such as a retainer or a bracket is placed on a jig or a lower mould die 120. The lower die 120 has a plurality of holes 122 in corresponding positions of the accessories 12, a plurality of grooves 14 for defining area for mounting the ornamental member, and a contact sensor or limit switch sensor 121 in the holes 122.

The contact sensor 121 can detect the accurate mounting of the main body 1.

Up the lower die 120 is positioned a cutting die or first upper die 130 which has cloth cutters 131 and can be moved in vertical direction by actuators 180, as shown in FIG. 7. Between the lower die 120 and the first upper die 130 lies a clamp device 170 which holds an ornamental member 15 on the bottom surface of which an adhesive is deposited in advance.

The clamp device 170 is then lowered so that the ornamental member 15 contacts the surface of the door trim main body 11 on the lower die 120. Since the surface of the door trim main body 11 is curved, the ornamental member 15 contacts the main body 1 1 with higher tension.

Figure 10:
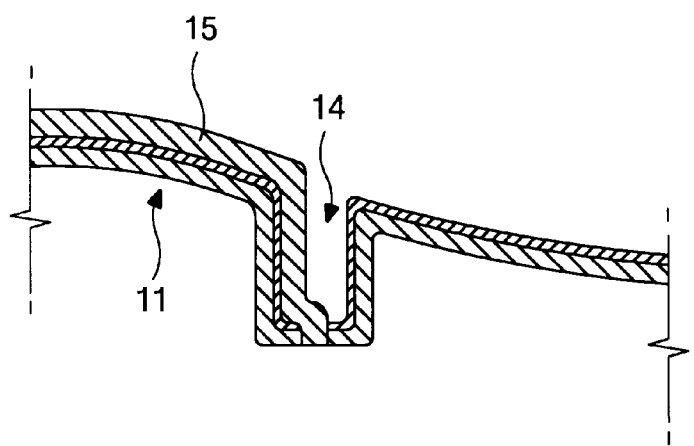
FIG. 10 is a front view of the process in which the peripheral edge of the ornamental member is being inserted into the slit shown in FIG. 8

The first upper die 130 is lowered to cut the ornamental member 15 with the cloth cutter 131. The cutting position of the cloth cutter 131 is shown in FIG. 10, which shows the ornamental member 15 is cut so that the edge of the ornamental member 15 covers the main groove 14.

Then the upper die 130 presses the ornamental member 15 in order to be fixed on the door trim main body 1.

The lower die 120 is moved to the position of an inserting die or second upper die 150, while another lower die with corresponding door trim main body is moved toward the first upper die 130 for successive process.

The second upper die 150 has an inserting bar 151.

Figure 8:
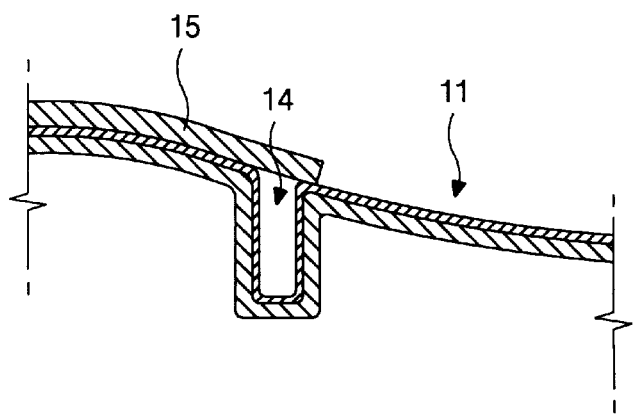
FIG. 8 is a front view of the process in which an ornamental member is being attached to the door trim main body of FIG. 7 with a second die.
Figure 9:
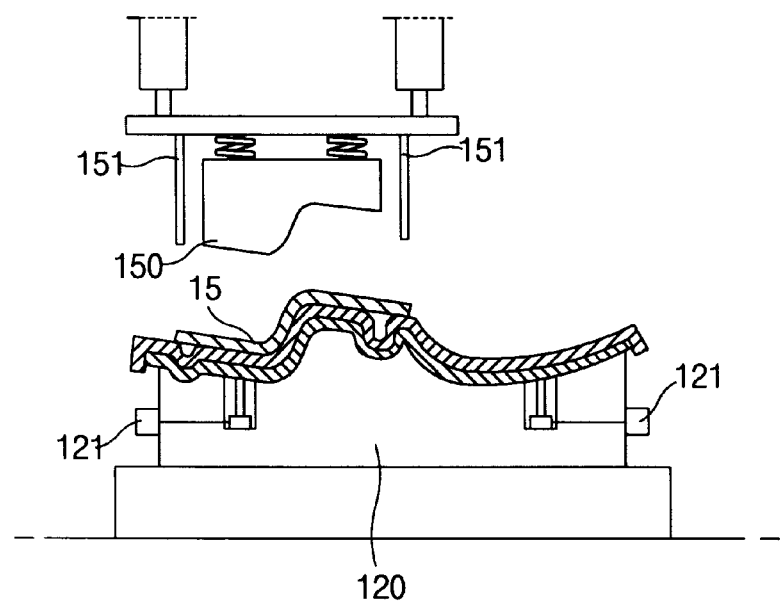
FIG. 9 is a sectional view showing the ornamental member contacting the door trim main body after the process of FIG. 8.

As shown in FIGS. 8 and 9, the second upper die 150 is lowered, and the peripheral edge of the ornamental member 15 is inserted into the main groove 14 of the door trim body 11 by the inserting bar 51.

As described above, the method for fabricating door trim of the present invention may be applied to a door trim which has a PVC sheet, or to a door trim which is made of only plastics.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for fabricating an automotive door trim by mounting an ornamental member on a predetermined surface area of a door trim main body, comprising the steps of:

forming a door trim main body which has a core layer, a foam layer, and a skin sheet, having at least one accessory in a predetermined position thereof, and a plurality of grooves for defining the predetermined surface area;

placing the door trim main body on a lower die which has at least one hole corresponding to the accessory of the door trim main body;

forming a slit in a corresponding groove of the door trim main body by fusing the skin sheet and the foam layer with a thermal cutter of a first upper die;

providing a second upper die having a cloth cutter;

providing a clamping device under the second upper die for holding an ornamental member which has a bonding agent on a corresponding surface of the predetermined surface area;

moving the lower die under the clamping device;

lowering the clamping device thereby contacting the ornamental member and the door trim main body;

lowering the second upper die thereby cutting the ornamental member with the cloth cutter to obtain a desired shape;

providing a third upper die having an inserting bar having a protruded inserting blade in a lower end of the inserting bar; and lowering the third upper die, thereby forcing the peripheral end of the ornamental member into the slit of the groove of the door trim main body.

2. The method of claim 1, wherein the hole of the lower die has a contact sensor for detecting accurate mounting of the door trim main body.

\* \* \* \* \*